(12) United States Patent
Hashiba et al.

(10) Patent No.: US 8,276,318 B2
(45) Date of Patent: Oct. 2, 2012

(54) DOOR OPENING AND CLOSING APPARATUS FOR VEHICLE

(75) Inventors: Shoichi Hashiba, Chiryu (JP); Yuichi Inoue, Aichi-gun (JP); Yukinori Wada, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/063,534

(22) PCT Filed: Sep. 22, 2009

(86) PCT No.: PCT/JP2009/066461
§ 371 (c)(1),
(2), (4) Date: Mar. 11, 2011

(87) PCT Pub. No.: WO2010/050317
PCT Pub. Date: Jun. 5, 2010

(65) Prior Publication Data
US 2011/0162283 A1 Jul. 7, 2011

(30) Foreign Application Priority Data
Oct. 29, 2008 (JP) .................................. 2008-277563

(51) Int. Cl.
*E05B 1/00* (2006.01)
(52) U.S. Cl. ................. 49/460; 49/502; 49/501; 16/412
(58) Field of Classification Search ............ 49/502, 49/501, 460; 296/180.1, 146.1; 16/412, 16/444; 292/336.6, DIG. 30
See application file for complete search history.

(56) References Cited

U.S. PATENT DOCUMENTS

| | | | |
|---|---|---|---|
| 6,234,041 B1 * | 5/2001 | Larabet et al. | 74/523 |
| 6,527,316 B1 * | 3/2003 | Agostini et al. | 292/347 |
| 6,577,228 B1 * | 6/2003 | Tsuchida et al. | 340/5.72 |
| 6,883,840 B2 * | 4/2005 | Sueyoshi et al. | 292/336.3 |
| 7,062,945 B2 * | 6/2006 | Saitoh et al. | 70/278.1 |

(Continued)

FOREIGN PATENT DOCUMENTS
JP 56-29154 U 3/1981
(Continued)

OTHER PUBLICATIONS
Information Disclosure Statement of App. 29319646.*
(Continued)

*Primary Examiner* — Katherine W Mitchell
*Assistant Examiner* — Marcus Menezes
(74) *Attorney, Agent, or Firm* — Buchanan Ingersoll & Rooney PC

(57) ABSTRACT

A door opening and closing device for a vehicle that can remove an object attached to operation surface of a door handle with a simpler structure is provided. The device includes a door handle. The door handle includes a grip and a deflective portion. The grip protrudes outward and defines a space between the outer surface of the door outer panel and the grip to allow gripping by a user. The deflective portion is located at an end of the grip and extends from the outer surface of the grip along the outer surface of the door outer panel in a direction crossing front and rear directions of the vehicle to direct air flow flowing along the outer surface of the door outer panel to flow through at least the space of the grip to the operation surface.

8 Claims, 5 Drawing Sheets

U.S. PATENT DOCUMENTS

| | | | |
|---|---|---|---|
| 7,237,411 B2 * | 7/2007 | Pantke et al. | 70/208 |
| 7,469,503 B2 * | 12/2008 | Wesson et al. | 49/475.1 |
| D598,729 S * | 8/2009 | Eschweiler et al. | D8/302 |
| 2004/0031908 A1 * | 2/2004 | Neveux et al. | 250/221 |
| 2005/0077737 A1 | 4/2005 | Komiyama et al. | |
| 2005/0231364 A1 | 10/2005 | Nitawaki et al. | |
| 2005/0253413 A1 * | 11/2005 | Munezane | 296/146.1 |
| 2007/0126246 A1 * | 6/2007 | Suzuki et al. | 292/336.3 |
| 2007/0158959 A1 | 7/2007 | Sakamoto | |

FOREIGN PATENT DOCUMENTS

| | | |
|---|---|---|
| JP | 58-13871 A | 1/1983 |
| JP | 62-12759 Y2 | 4/1987 |
| JP | 2000-192695 A | 7/2000 |
| JP | 2002-295094 A | 10/2002 |
| JP | 2004-98844 A | 4/2004 |
| JP | 2005-082090 A | 3/2005 |
| JP | 2005-207051 A | 8/2005 |
| JP | 2005-282204 A | 10/2005 |
| JP | 2007-146593 A | 6/2007 |
| JP | 2007-177422 A | 7/2007 |

OTHER PUBLICATIONS

TriMark '30-425 Inside Bezel & Release Lever Assembly' ISO 9001 Aug. 1994, 2 pages.*

TriMark 100-5000 System—Vehicle Door Hardware dated Sep. 1990.*

English language translation of the International Preliminary Report on Patentability (Form PCT/IB/373) and Written Opinion of the International Searching Authority (Form PCT/ISA/237) dated Jun. 7, 2011, issued by the International Bureau of WIPO in international Application No. PCT/JP2009/066461.

International Search Report (PCT/ISA/210) issued on Nov. 2, 2009, by Japanese Patent Office as the International Searching Authority for International Application No. PCT/JP2009/066461.

Written Opinion (PCT/ISA/237) issued on Nov. 2, 2009, by Japanese Patent Office as the International Searching Authority for International Application No. PCT/JP2009/066461.

Japanese Office Action issued Apr. 24, 2012 by the Japanese Patent Office in Japanese Patent Application No. 2008-277563, and English language translation.

* cited by examiner

DOOR OPENING AND CLOSING APPARATUS FOR VEHICLE

TECHNICAL FIELD

The present invention relates to a door opening and closing apparatus for a vehicle that includes a door handle attached to an outer panel of a vehicle door and that can remove an object such as a droplet or dust adhering to an operation surface of the door handle.

BACKGROUND ART

Conventional door opening and closing apparatus for a vehicle include a door handle attached to a vehicle door, with a space defined by a recess provided in the vehicle door located at the back of a gripper of the door handle. A user inserts his hand into the space to put his finger tip on the back of the grip. That is, the space allows gripping of the door handle by the user. This apparatus includes an injection nozzle that faces the back of the gripper opposing the space. Air injected from the injection nozzle blows off rain drops attached to the back of the gripper to clear the back of the grip. This prevents the user's finger tip from getting wet in contacting the back of the gripper. For example, see Patent Document 1.

Patent Document 1: Japanese Laid-open Patent Publication No. 2007-146593.

However, in the door opening and closing apparatus for a vehicle of Patent Document 1, an injection nozzle that injects air is required to blow off rain drops attached to the back of the grip of the door handle. In addition, an additional pipe or a fan is necessary to feed air into the injection nozzle. This adds to the number of required parts for the apparatus, and is disadvantageous with respect to cost. Space for placing the injection nozzle is required in the vehicle door, which is less practical.

DISCLOSURE OF THE INVENTION

Accordingly, it is an object of the invention to provide a door opening and closing apparatus for a vehicle which can remove an object such as a droplet or dust adhering to an operation surface of a door handle with a simpler structure.

To achieve the above object, a door opening and closing device is provided for a vehicle including a door handle that is attached to a door outer panel constituting a vehicle door and that extends in front and rear directions of the vehicle. The door outer panel includes an outer surface. The door handle includes a grip and a deflective portion. The grip protrudes outward and defines a space between the outer surface of the door outer panel and the grip to allow gripping by a user. The grip includes an outer surface and an operation surface opposing the outer surface of the door outer panel. The deflective portion is located at an end of the grip and extends from the outer surface of the grip along the outer surface of the door outer panel in a direction crossing the front and rear directions of the vehicle to direct air flow flowing along the outer surface of the door outer panel to flow through at least the space of the grip to the operation surface.

According to the invention, a portion of air that flows in the front and rear directions of a vehicle along the outer surface of the door outer panel during driving of the vehicle becomes an air flow that is directed to the space near the door handle with the deflective portion. This allows the air flow to blow off an object formed on the grip such as a droplet or dust adhering to an operation surface of a door handle.

More preferably, wherein the space is configured by a recess formed in the door outer panel opposing the operation surface of the grip. The apparatus further comprises a first guiding depression that serves as an inlet for the air flow and that is formed in the door outer panel to extend along the door handle and connect to the recess.

It is preferable that the first guiding depression aligns with the deflecting portion in the front and rear directions of the vehicle and be located at an end of the grip opposite to an end where the deflective portion of the grip is located. This make an air flow directed to the space smoothly without stagnating within the space. Thus, the object can be blown off effectively and reliably.

More preferably, the apparatus further comprises a second guiding depression that serves as an outlet of the air flow from the space and that is formed in the door outer panel to extend along the door handle and to connect to the recess. It is preferable that the second guiding depression be located at an end of the grip where the deflective portion of the grip is located and which is opposite to the end where the first guiding depression is located.

More preferably, the apparatus further comprises a sensor that is housed in the grip and that detects approach of a user toward the operation surface based on a change in electrostatic capacity.

Preferably, the deflective portion crosses front and rear directions of the vehicle to form an acute angle with the grip.

Preferably, the deflective portion defines a flat surface.

Preferably, the deflective portion defines a flat surface and crosses front and rear directions of the vehicle to form an acute angle with the grip.

MODES FOR CARRYING OUT THE INVENTION

Figure 1:
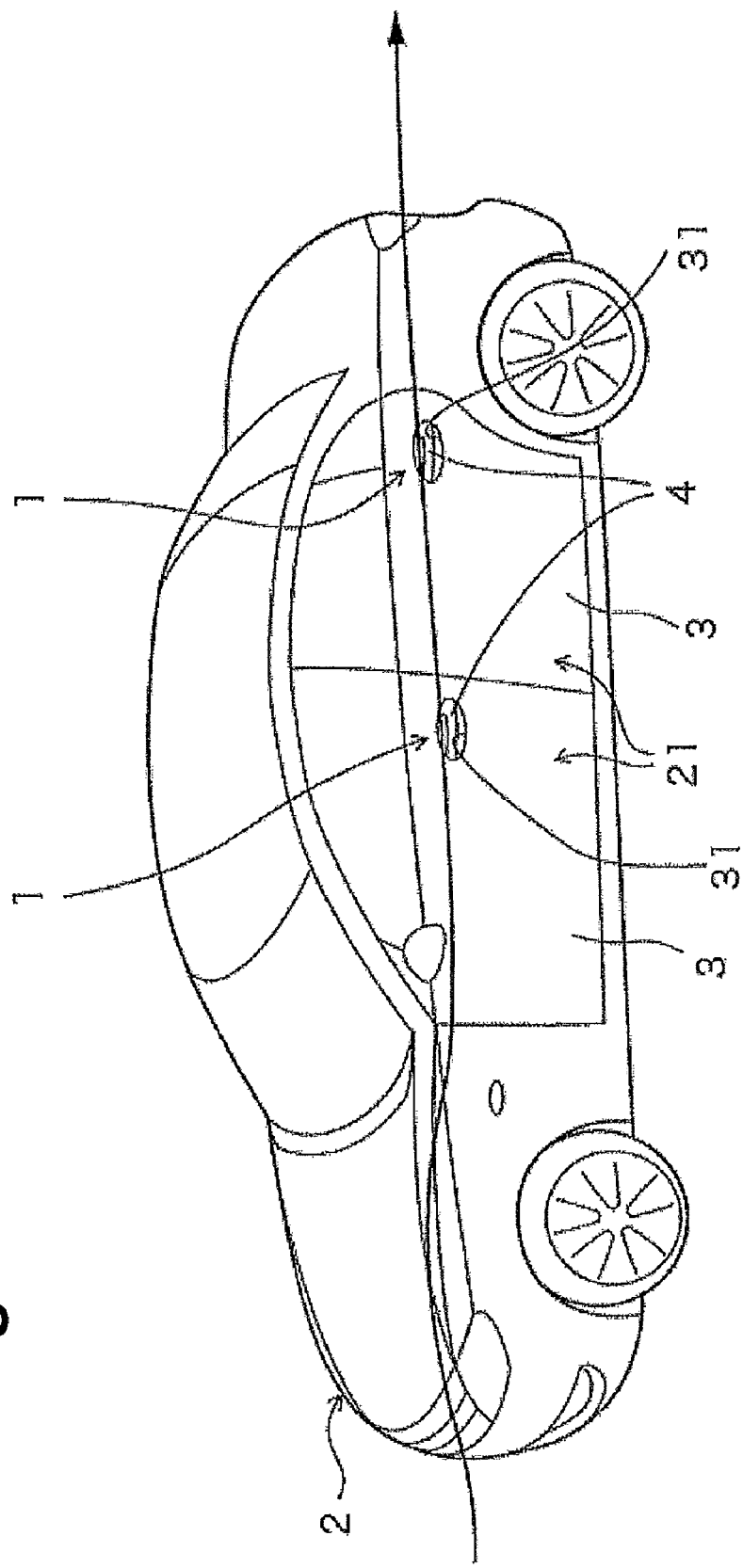
FIG. 1 is a perspective view of a vehicle equipped with a door opening and closing apparatus for a vehicle according to the invention.
Figure 2:
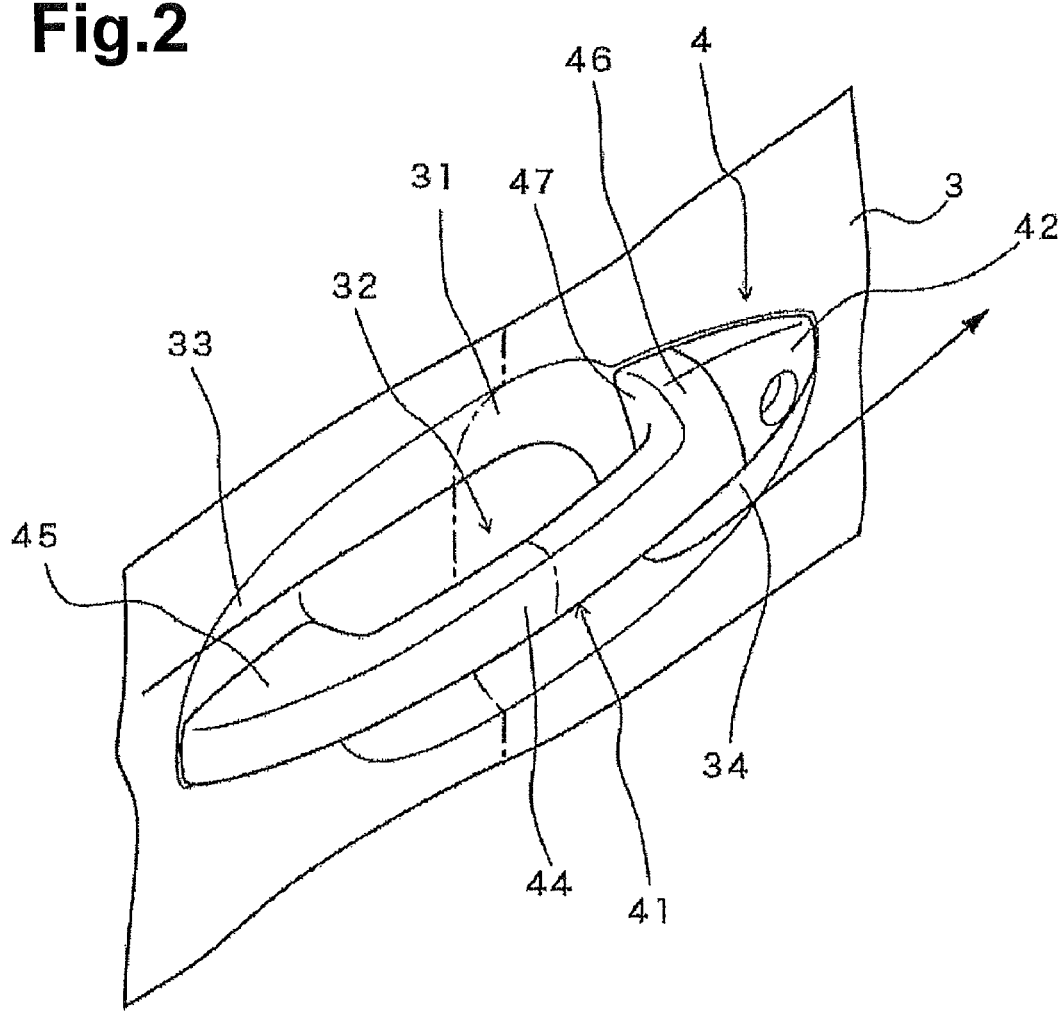
FIG. 2 is a perspective view of the door opening and closing apparatus for a vehicle according to the invention.
Figure 3:
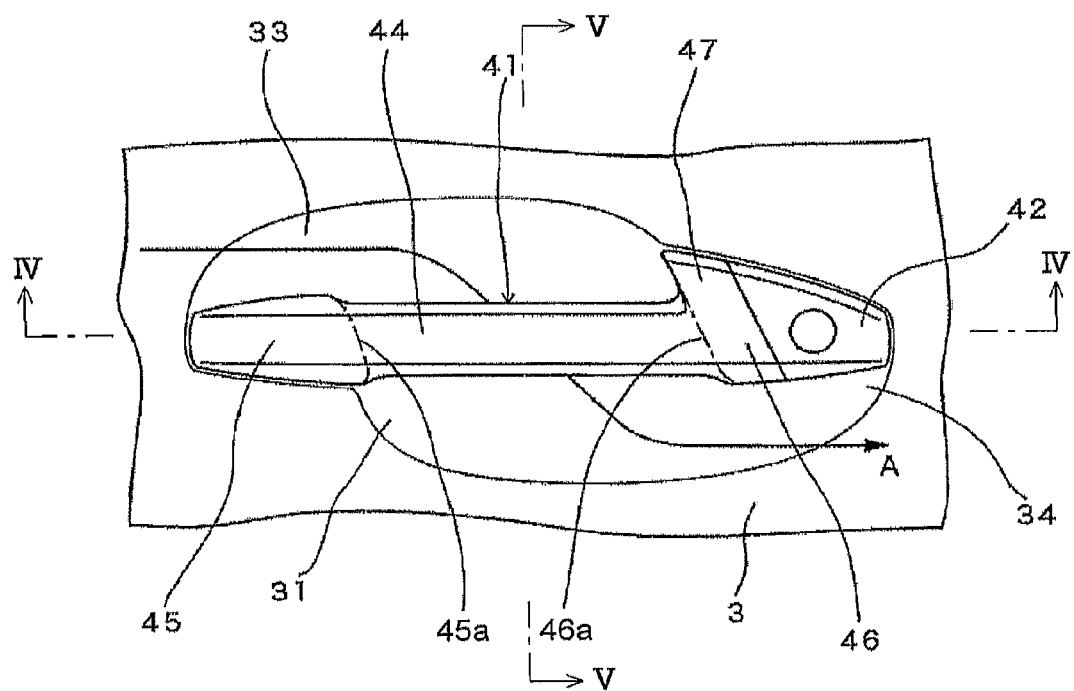
FIG. 3 is a front view of the door opening and closing apparatus.
Figure 4:
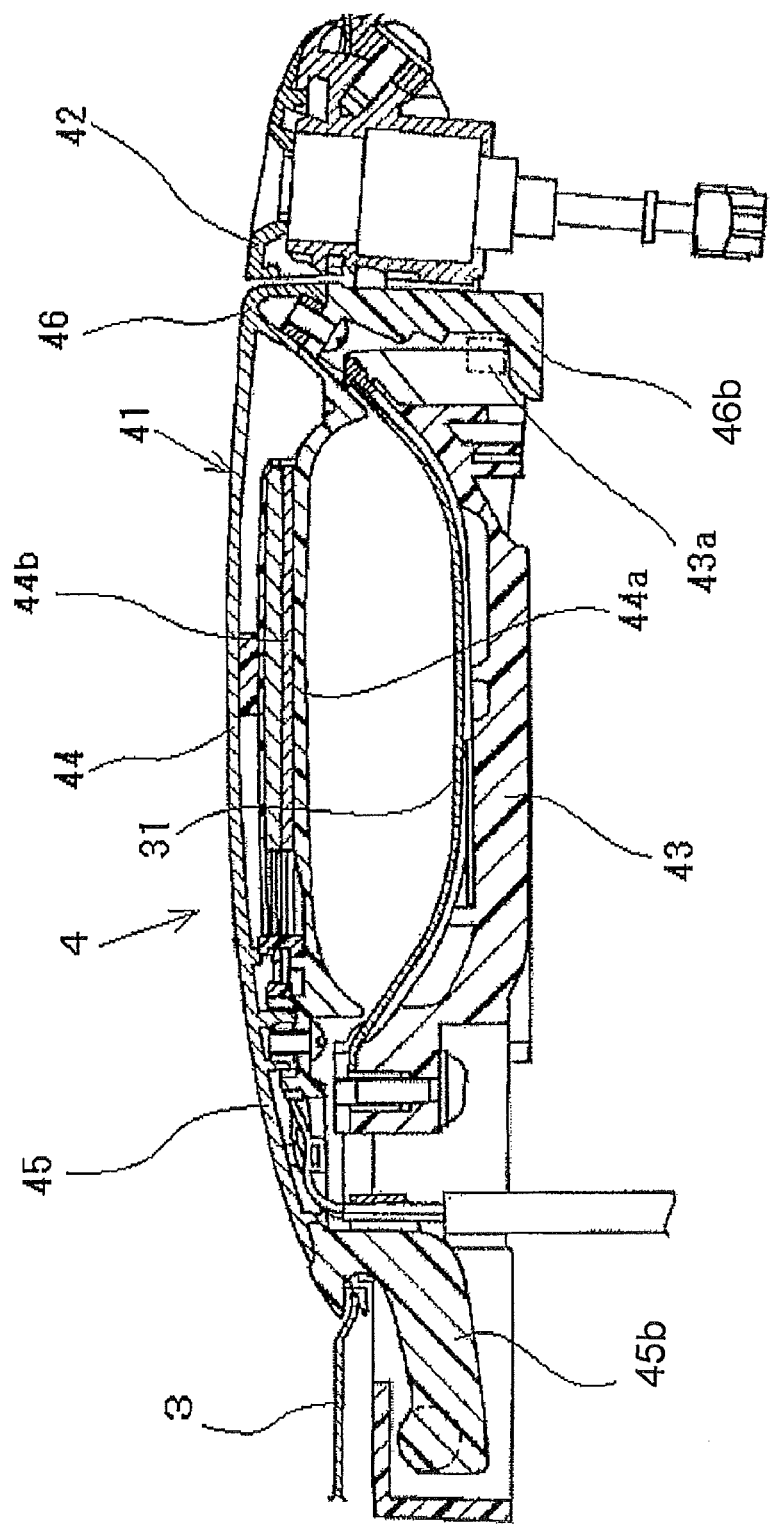
FIG. 4 is a longitudinal cross-sectional view taken along line IV-IV of FIG. 3.

Referring to FIGS. 1 to 5, a door opening and closing apparatus 1 according to one embodiment of the invention will be described. FIG. 1 is a perspective view of a vehicle 2 equipped with the door opening and closing apparatus 1, wherein the left side of the drawing is a front side of the vehicle and the upper side of the drawing is an upper side of the vehicle. FIG. 2 is a perspective view of the door opening and closing apparatus 1. FIG. 3 is a front view of the door opening and closing apparatus 1, wherein the left side of the drawing is a front side of the vehicle and the upper side of the drawing is an upper side of the vehicle. FIG. 4 is a longitudinal cross-sectional view of the door opening and closing apparatus 1, wherein the left side of the drawing is a front side of the vehicle and the upper side of the drawing is an upper side of the vehicle.

First, a basic structure of the door opening and closing apparatus 1 will be described.

As illustrated in FIGS. 1 to 4, the door opening and closing apparatus 1 is mounted on a side door 21 of the vehicle 2. The door opening and closing apparatus 1 includes a door outside handle 4 attached to a door outer panel 3 of the side door 21.

Continuous with an outer surface of the outer panel 3 (an outer surface of the side door 21), a depression or recess 31 is formed in the door outer panel 3 in a given position of the side door 21. The door outside handle 4 includes an elongate handle body 41 as a door handle, an end cap 42 and a handle frame 43. The handle frame 43 is positioned inside the side door 21 while the handle body 41 and the end cap 42 are positioned outside the side door 21. The door outside handle 4 is attached to the side door 21 in a manner that the handle body 41 and end cap 42, and the handle frame 43 sandwiches the door outer panel 3. The end cap 42 is arranged in parallel with the handle body 41 at the rear side of the handle body 41. In the door outside handle 4, the handle body 41 and the end cap 42 have a streamlined shape, as a whole, when viewed from the front as in FIG. 3.

The handle body 41 assumes an arcuate configuration that extends in a longitudinal direction, as a whole. The handle body 41 is arranged in a manner so that the handle body 41 passes over the recess 31 of the door outer pane 3 in front and rear directions of the vehicle and protrudes relative to an outer surface of the door outer panel 3 so that the longitudinal direction of the handle body 41 corresponds to front and rear directions of the vehicle. The handle body 41 includes a grip 44 as a gripper at the middle portion of the handle body 41 and seats 45 and 46 at both ends of the handle body 41 along the longitudinal direction of the handle body 41. The seats 45 and 46 are mounted on the outer surface of the door outer panel 3. The grip 44 is rod-shaped having a generally circular cross section. The seats 45 and 46 are column-shaped and continuous with the grip 44. The seat 45 and 46 are located on opposite sides of the recess 31 in front and rear directions of the vehicle and adjacent the recess 31.

The grip 44, in cooperation with the recess 31, forms a space 32 between the grip 44 and the outer surface of the door outer panel 3. The space 32 allows gripping by a user. The grip 44 includes an operation surface 44*a* that opposes the outer surface of the door outer panel 3. An electrode 44*b* is housed in the grip 44 and serves as a sensor for detecting approach of a user toward the operation surface 44*a* based on change in electrostatic capacity. The electrode 44*b* is connected to an ECU (not shown) that controls a door lock device (not shown). The door lock device holds the side door 21 in a closed position and has a releasing feature that releases the holding of the closed position as well as locking and unlocking features. Such a door lock device is well known in the art.

In the seat 45 that is located on the front side of the vehicle relative to the grip 44, a support arm 45*b* is formed to extend through the door outer panel 3 into the side door 21. In the seat 46 that is located on the rear side of the vehicle relative to the grip 44, an operation arm 46*b* is formed to extend through the door outer panel 3 into the side door 21. The support arm 45*b* is rotatably supported with the handle frame 43. The operation arm 46*b* is linked with the door lock device via a bell crank link 43*a* that is rotatably supported with the handle frame 43.

Basic operation of the door opening and closing apparatus 1 as configured above will be described.

When a user puts his finger on the operation surface 44*a* of the grip 44 of the handle body 41 in a state where the side door 21 is closed, the electrode 44*b* detects the change in electrostatic capacity caused by the action of the user to unlock the door lock device. Then, when a user moves the handle body 41 relative to the door outer panel 3 in a direction outward from the vehicle, the handle body 41 swings at the center of the rotational axis of the support arm 45*b* with respect to the handle frame 43 in a manner that the seats 45 and 46 move away from the outer surface of the door outer panel 3 (the seat 46 swing greater than the seat 45) so that the operation arm 46*b* releases the door lock device via the bell crank link 43*a*. This operation releases the holding of the closed position of the side door 21 to cause the side door 21 to be openable.

Next, the structure of the door opening and closing apparatus 1 according to the invention will be described.

As illustrated in FIGS. 2 and 3, a protrusion 47 is provided in the seat 46 so that the protrusion 47 so that the protrusion 47 protrudes in an upper direction of the vehicle further than the upper end of the grip 44 to extend in a direction crossing front and rear directions of the vehicle along the outer surface of the door outer panel 3. Inner side faces of the protrusion 47 and the seat 46 adjacent the recess 31 define an inclined flat surface 46*a*. The upper end of the flat surface 46*a* at the upper side of the vehicle is anterior to the lower end of the flat surface 46*a* at the lower side of the vehicle. That is, the protrusion 47 makes an acute angle with the grip 44. An inner side face of the seat 45 adjacent the recess 31 defines an inclined flat surface 45*a* that is generally parallel with the inclined flat surface 46*a*.

In the door outer panel 3, a first guiding depression 33 that extends forward of the vehicle along the upper side of the seat 45 and a second guiding depression 34 that extends rearward of the vehicle along the lower side of the seat 46. The first guiding depression 33 is arranged in a position to align with the protrusion 47 in front and rear directions of the vehicle. The first guiding depression 33 is connected to the front end of the recess 31 and continuous with the outer surface of the door outer panel 3. The second guiding depression 34 is connected to the rear end of the recess 31 and continuous to the outer surface of the door outer panel 3.

Next, operation of the door opening and closing apparatus 1 according to the invention will be described.

Figure 5:
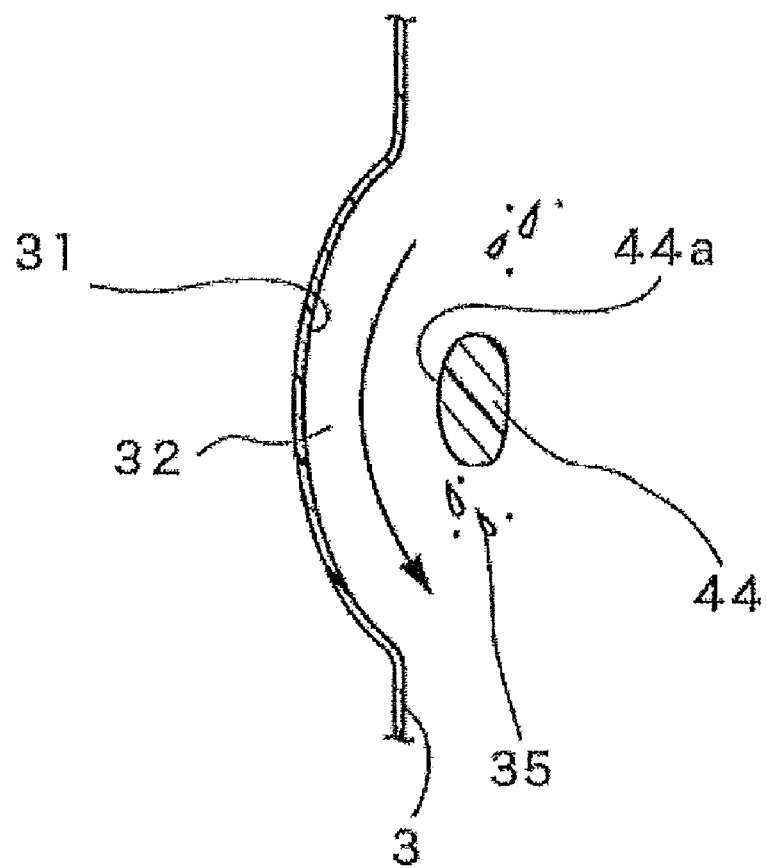
FIG. 5 is a cross-sectional view taken along line V-V of FIG. 3 and illustrating operation of the door opening and closing apparatus.

While the vehicle 2 is moving forward, air flow (i.e., wind that occurs when the vehicle is being driven) flowing in the direction indicated by the arrow in FIG. 1 occurs on the side of the vehicle 2. As illustrated by the arrows in FIGS. 2 and 3, this wind becomes the flow A around the door opening and closing device 1 that enters the recess 31 from the forward end through the first guiding depression 33 and exits rearward through the second guiding depression 34. The flow A is generated by the effect that the protrusion 47 receives wind flowing along an upper end of the grip 44 and the inclined flat surfaces 45*a* and 46*a* guide the received wind flow into the recess 31. As illustrated in FIG. 5, this eliminates stagnation of air in the space 32 that faces the operation surface 44*a* of the grip body 44 and blows off foreign objects 35 such as a droplet or dust adhering to the operation surface 44*a*.

As described above, by forming the protrusion 47 in the door outside handle 4 to generate the flow A directed toward the space 32 from a part of the wind generated by driving of the vehicle 2 so that a foreign object 35 adhering to the operation surface 44*a* is blown off, this reduces instances of discomfort arising from a foreign object 35 adhering to a user's finger when the user opens or closes the side door 21. In addition, an undesirable effect of the foreign object 35 on detection of the change in electrostatic capacity by the electrode 44*b* can also be suppressed, which prevents an error of the electrode 44*b* due to the presence of a foreign object 35. Moreover, since the foreign object 35 is blown off by use of a part of the wind generated by driving of the vehicle, an injection nozzle or a fan is unnecessary. Thus, the parts and costs for the apparatus are reduced.

In the present embodiment, the projection 47 is formed at the seat 46 of the handle body 41. Instead, however, the position where the projection 47 is formed is not limited to the seat 46 as long as it resides at the end of the grip 44. The projection 47 may be formed at the end cap 42 adjacent to the seat 46. In addition, the first guiding depression 33 and the second guiding depression 34 are not always required. It should be understood that the end of the grip 44 refers to an end portion of the door outside the handle 4 in the longitudinal direction of the handle 4 and encompasses the seat 46 and the end cap 42.

The invention claimed is:

1. A door opening and closing device for a vehicle including a door handle that is attached to a door outer panel constituting a vehicle door and that extends in front and rear directions of the vehicle, wherein the door outer panel includes an outer surface, wherein the door handle comprises:
a grip that protrudes outward and defines a space between the outer surface of the door outer panel and the grip to allow gripping by a user, wherein the grip includes an outer surface and an operation surface opposing the outer surface of the door outer panel, and the grip extends in front and rear directions of the vehicle and has a front end and a rear end with respect to the front and rear directions; and
a deflective portion that is located at the rear end of the grip and extends from the outer surface of the grip along the outer surface of the door outer panel in a direction crossing front and rear directions of the vehicle to direct air flow flowing along the outer surface of the door outer panel to flow through at least the space of the grip to the operation surface, wherein the deflective portion is integrated with the grip and includes an inclined surface extending from and being continuous with the outer surface of the grip, wherein the inclined surface has an upper end and lower end with respect to upper and lower directions of the vehicle, and the inclined surface is inclined relative to upper and lower directions of the vehicle such that the upper end is anterior to the lower end with respect to front and rear directions of the vehicle.

2. The door opening and closing device for a vehicle of claim 1 wherein the space is configured by a recess formed in the door outer panel opposing the operation surface, wherein the device further comprises a first guiding depression that serves as an inlet of the air flow and that is formed in the door outer panel to extend along the door handle and to connect to the recess, wherein the first guiding depression aligns with the deflecting portion in front and rear directions of the vehicle and is located at the front end of the grip.

3. The door opening and closing device for a vehicle of claim 2 further comprising a second guiding depression that serves as an outlet of the air flow from the space and that is formed in the door outer panel to extend along the door handle and to connect to the recess, wherein the second guiding depression is located at the rear end of the grip.

4. The door opening and closing device for a vehicle of claim 1 further comprising a sensor that is housed in the grip and that detects approach of a user to the operation surface based on the change in electrostatic capacity.

5. The door opening and closing device for a vehicle of claim 1 wherein the deflective portion crosses front and rear directions of the vehicle to form an acute angle with the grip.

6. The door opening and closing device for a vehicle of claim 1 wherein the deflective portion defines a flat surface.

7. The door opening and closing device for a vehicle of claim 1 wherein the deflective portion defines a flat surface and crosses front and rear directions of the vehicle to form an acute angle with the grip.

8. The door opening and closing device for a vehicle of claim 1, wherein the deflective portion has an upper end and lower end with respect to upper and lower directions of the vehicle, and the deflective portion is inclined relative to upper and lower directions of the vehicle such that the upper end is anterior to the lower end with respect to front and rear directions of the vehicle.

* * * * *